June 30, 1931. R. K. GULLBERG 1,812,651
DUPLEX MOTOR DRIVE ASSEMBLY FOR KITCHEN APPLIANCES
Filed June 3, 1925 3 Sheets-Sheet 1

Inventor
Roy K. Gullberg
By his Attorneys
Cooper, Kerr & Dunham

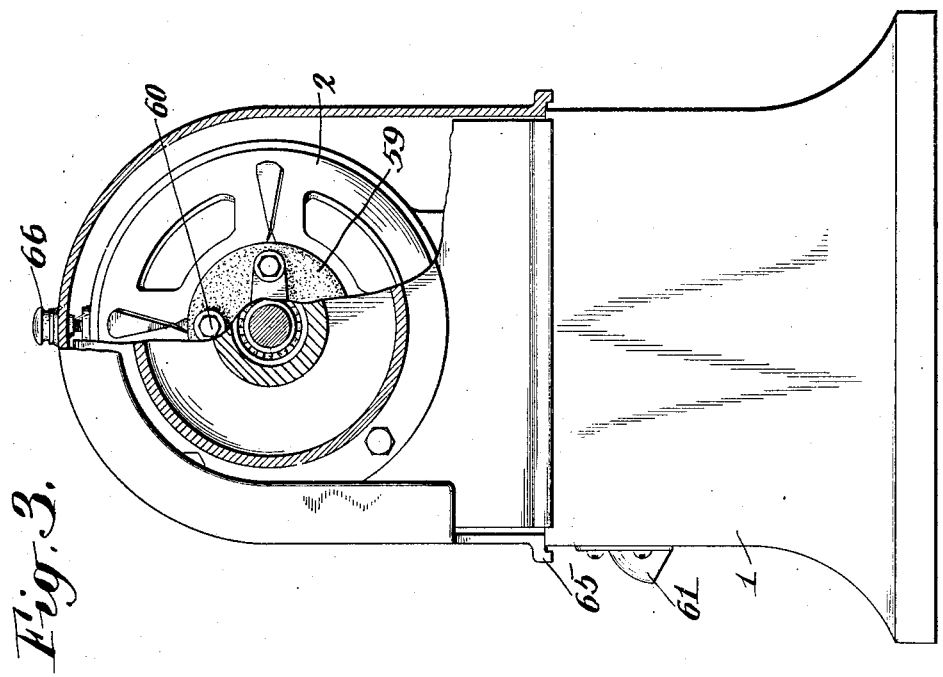
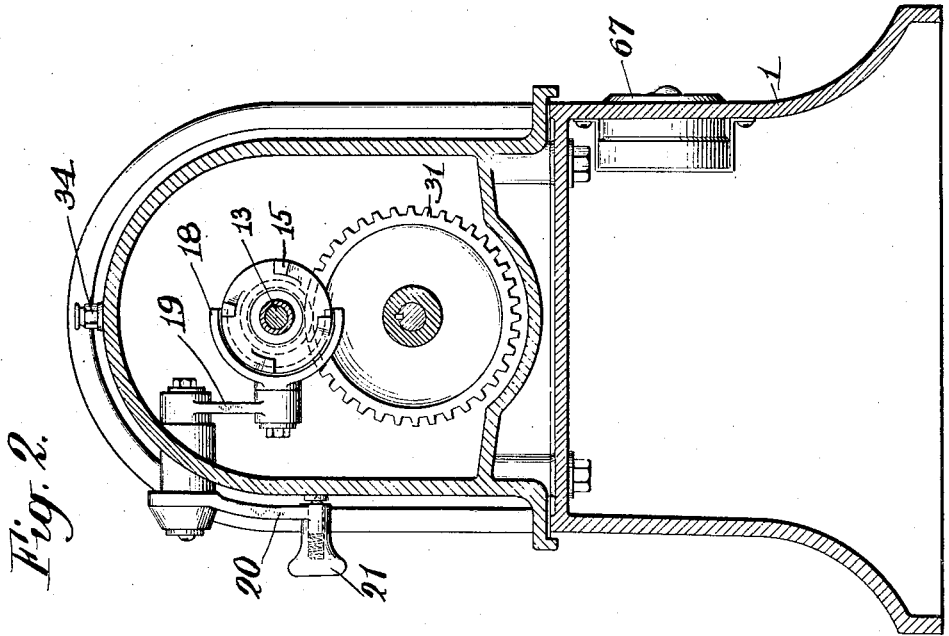

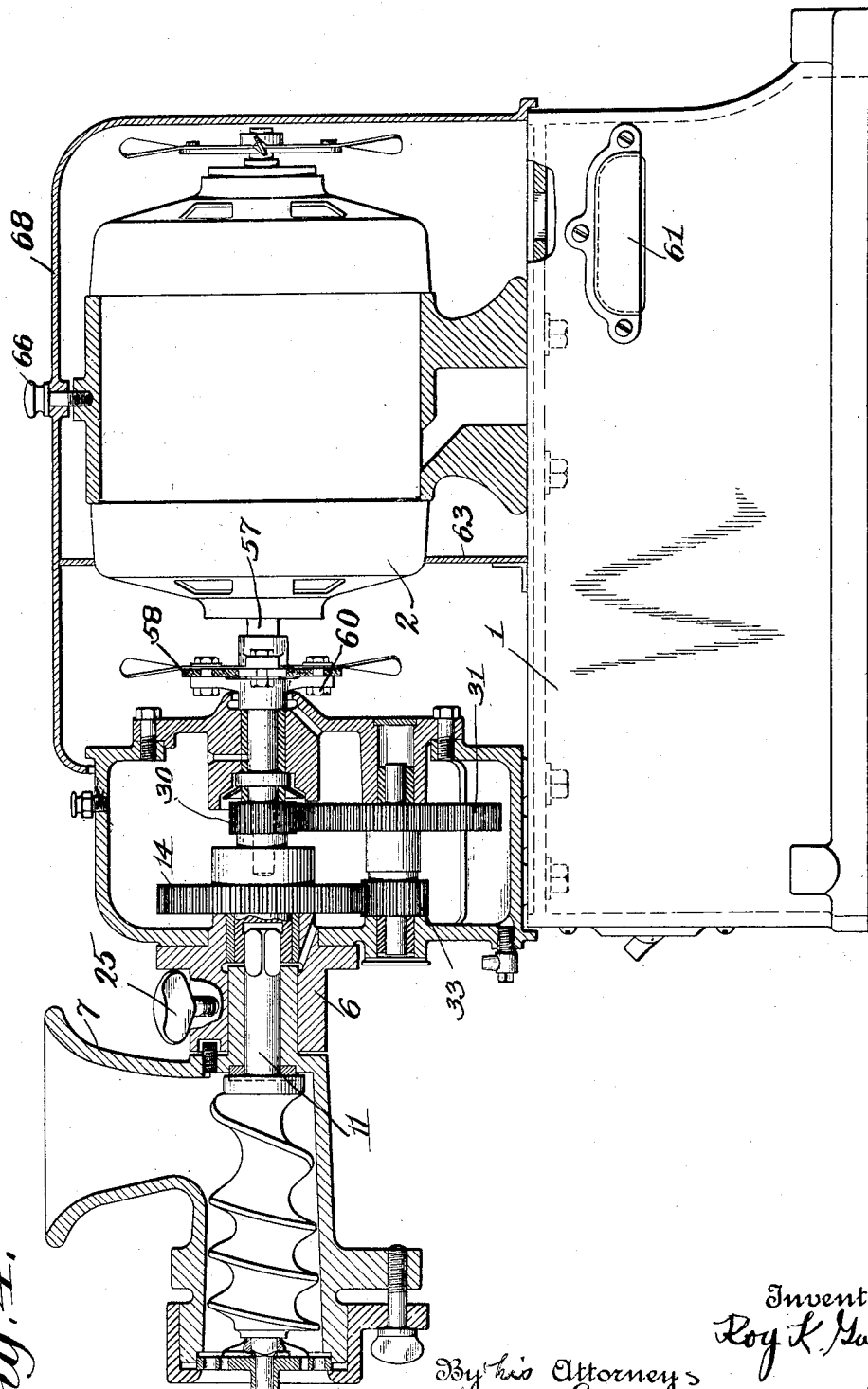

Patented June 30, 1931

1,812,651

UNITED STATES PATENT OFFICE

ROY KARL GULLBERG, OF DAYTON, OHIO, ASSIGNOR TO DAYTON SCALE COMPANY, OF DAYTON, OHIO, A CORPORATION OF NEW JERSEY

DUPLEX MOTOR DRIVE ASSEMBLY FOR KITCHEN APPLIANCES

Application filed June 3, 1925. Serial No. 34,570.

This invention relates to motor driven meat chopper and coffee grinding appliances and more particularly to the structural relation and mounting of the same.

For family and store use there is a constant demand for a convenient assembly of a meat chopper and coffee grinder mounted in close relation to one another and driven by a single standard motor which is protected from injury by fine grounds and dust and, at the same time, is properly ventilated.

It is the purpose of this invention to produce a compact assembly of the type described mounted upon a common base and having appliances which may be independently removed without interfering with one another.

Another object is to so connect these appliances that the use of an ordinary motor of standard construction is possible for driving purposes.

Another object is to provide a sanitary structure having a hood for completely enclosing the motor and rotating parts which also serves the purpose of making it possible to keep a constant flow of air about the rotor by means of fan blades attached to the rotor shaft.

Other and incidental objects will be pointed out hereinafter in the specification and claim, and illustrated in the accompanying drawings in which, Fig. 1 is a front view of the entire assembly showing the meat chopper and coffee grinder in section.

Fig. 2 is a sectional view on line 2—2 of Fig. 1.

Fig. 3 is a view on line 3—3 of Fig. 1.

Fig. 4 is a view of a motor mounting having driving connections for a single unit.

Figure 1:
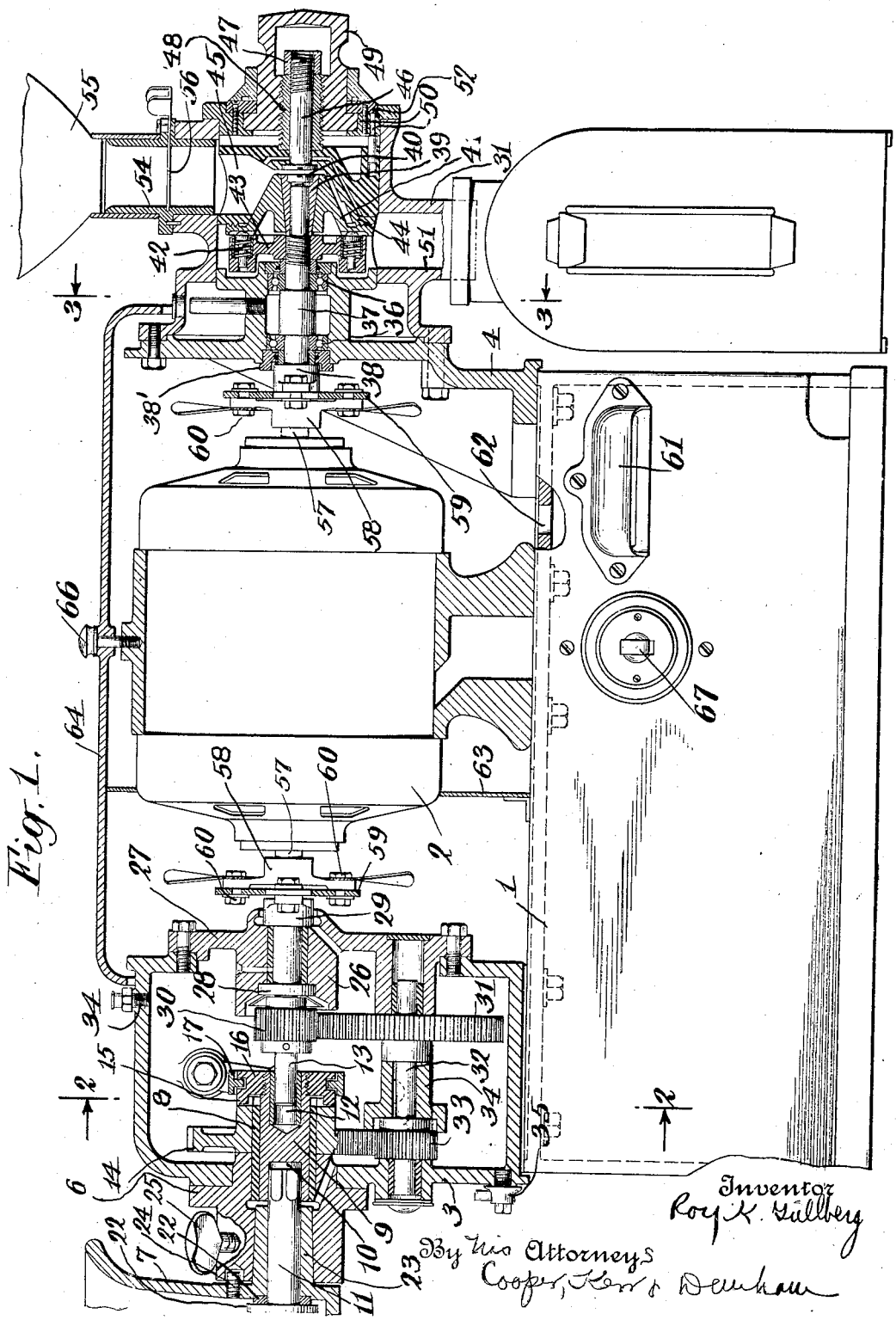

Referring to the drawings, 1 is a box like base for supporting the motor 2 and the frames 3 and 4 of the meat chopper and coffee grinder respectively. These three pieces are rigidly and independently secured to the base by means of bolts 5 or any other suitable means. Frame 3 is a rectangular shaped casting having a rounded top and ends open. In the left hand opening there is fastened a bushing 6 constituting the means of support of the meat chopper 7 as well as serving as a support for sleeve bearing 8. Mounted within sleeve bearing 8 is a socket member 9 having in its left end a socket 10 for receiving the fluted end of the meat chopper screw 11. In the right hand end is a deep recess 12 lined with bearing material for the purpose of supporting the end of shaft 13 and at the same time allowing for axial movement of the socket member.

Free to rotate on the outer surface of sleeve 8 is mounted a gear 14 having notches in its hub for engagement by teeth 15 on clutch 16 fast to socket member 9. Clutch 16 is moved into and out of engagement with gear 14 by a collar 17 and a yoke 18 which is connected thereto and manipulated by a crank arm 19 fast to a shaft mounted in frame 3, Fig. 2. To the outer end of this shaft is fixed an arm 20 which carries a plunger knob 21 having a stem for engaging one of the two holes in the frame designating the operative or inactive condition of the meat chopper as controlled by the position of clutch member 16. The axial thrust of screw 11 is opposed by a thrust bearing 22 and no unusual force is experienced in sliding socket 9 to discontinue the operation of the screw. The meat chopper has a hub 23 which may be tapered to form a close and binding fit in bushing 6 and a screw 24 is provided to engage a recess in the bushing so as to prevent rotary movement of the chopper. Hub 23 may be cylindrical as shown in Fig. 4 and in that case a thumb screw 25 is provided to lock the chopper in place.

The right hand end of shaft 13 is supported in a hub 26 of journal plate 27 and is held from axial displacement by a collar 28 and a coupling member 29. To shaft 13 is secured a pinion 30 which drives gear 31 on countershaft 32 suitably mounted below shaft 13 with the left end journaled in frame 3 and the right hand end journaled in journal plate 27. To shaft 32 is fastened a gear 33 which meshes with gear 14 to drive the screw. A spacer 34 is mounted on shaft 32 intermediate pinion 33 and gear 31 in order to keep gear 14 from sliding longitudinally of sleeve 8. All of this mechanism is self contained within the box like frame 3 and may be oiled through oil hole 34. A drain cock 35 is provided to empty the used oil when necessary.

Frame member 4 constitutes the supporting structure of bearings 36 of shaft 37 to the left end of which is secured a coupling member 38. Bearing 36 just to the right of coupling 38 takes up the longitudinal thrust of shaft 37 and it is maintained in place by collar 38'. The right end is of smaller diameter and carries a tapered sleeve 39 secured in place by screw 40. Grinder cone 41 fits over tapered sleeve 39 and is maintained in frictional contact therewith by the force exerted by a plurality of spring pressed plungers 42 mounted in spider 43 having a fixed relation to shaft 37. This arrangement allows for a longitudinal movement of cone 41 away from the fixed grinder cone 44 to save the parts from destruction should a nail or other hard material come between the grinding surfaces. Cone 44 is maintained in its position within chamber 45 by means of a bolt 46 and nut 47 supported by a hollow screw 48 in thimble 49. Thimble 49 is rotatively mounted within collar 50 which is secured to casting 51 suported by frame 4. A ring 52 serves to keep thimble 49 from translatory motion and it is evident that a rotation of the thimble will cause cone 44 to move toward or away from grinder 41 thereby creating a mode of adjustment of size of coffee grounds to be produced. Plunger 53 prevents cone 44 from being displaced but allows for it longitudinal adjustment.

Fastened to the top of casting 51 is a tubular member 54 which supports at its top a bowl 55 for receiving the coffee berries. A sliding gate 56 is provided to separate different measured orders.

The motor may be of standard construction and has at each end of its rotor shaft 57 a coupling member 58 for cooperative relation with coupling members 29 and 38. Each coupling member 58 is connected to its adjacent coupling member by means of a flexible piece of fibrous material 59 and bolts 60. The bolts 60 each secure a fan blade in position so as to create a current of air about the rotor. Air is drawn in through louver 61 and hole 62 in base 1 and is exhausted around the edge of frame 3. Baffle plate 63 insures the passage of air through the rotor.

A hood 64 extends over the motor and between frames 3 and 4 so as to protect the windings and commutator of the motor from the fine coffee dust and other injurious material. This hood is preferably of heavy material and has a clip 65, Fig. 3 around its lower edge to form a close fit on the top of the base. Thumb screw 66 provides a means of securing the hood firmly in place and eliminates any possibility of vibration. The operation of the motor is controlled by a switch 67 suitably mounted on the front side of the base.

In Fig. 4 I have illustrated the application of my invention in an embodiment wherein but one appliance is driven by a motor. In this case the hood or cover 68 is closed at one end so as to completely protect the rotating parts of the motor and fan blades. Since only one appliance is being driven by the motor the switch is sufficient to control the operation and no clutch mechanism is necessary.

What I claim is:

In a device of the class described, a housing, a bearing frame secured thereto, a motor-driven shaft journalled in the bearing frame, a member constantly drivingly connected to a food instrumentality extending coaxial with said shaft and having a socket for rotatably receiving the shaft, said member being rigidly provided with a clutch element, a coacting clutch and driving element geared to the motor driven shaft, said latter clutch element freely embracing aforesaid member, a bearing frame for the latter rigid with said housing and on the side thereof opposite the first-mentioned bearing frame, and means for slidably actuating aforesaid member at will to connect and disconnect the clutch element thereof from the coacting clutch element.

In testimony whereof I hereto affix my signature.

ROY KARL GULLBERG.